Fig. 4.

INVENTOR.
William B. Hildmann
BY
Atty

United States Patent Office 3,180,253
Patented Apr. 27, 1965

3,180,253
MULTI-STATION EMBOSSING MACHINE
William B. Hildmann, Oak Park, Ill., assignor to Brock and Rankin, Chicago, Ill., a corporation of Illinois
Filed Apr. 4, 1961, Ser. No. 100,545
10 Claims. (Cl. 101—41)

This invention pertains to improvements in gold stamping and embossing machines adapted for the manufacture of book casings or covers, and provides a machine capable of stamping combinations of gold, silver and brilliantly colored foil embossments on both the backbone and front cover of a conventional set of covers, all in a single pass in a rapid, continuous-flow process which eliminates much of the costly rehandling and re-running of individual covers heretofore necessary in producing diversified color embossments and registered overlays on prior types of embossing machine, the new machine being smaller in size, safer in operation, and relatively lower in cost than the heavy-duty machines heretofore available, and being especially characterized by a significant reduction in waste of costly gold and silver foils by reason of a novel foil-feeding and distributing system.

Important features of novelty characterizing the new machine relate generally to an arrangement of three stamping heads at succeeding stations overlying the path of serially-advanced, exactly-registered, cases moved step-by-step along a feed bed, with two of the heads overlying and imprinting only the backbone panel of the covers, while a third head is enlarged and offset from the others in a zone to imprint both the backbone and the front cover simultaneously, means being also provided for differentially feeding and distributing multiple webs or ribbons of metal foil of different widths and lustres across different imprinting zones at each die so that different typographic and design impressions in a variety of colorations can be had on both the backbone and cover portions of the casing in a single pass with better quality and register, and at a higher rate and lower cost, than heretofore possible.

Additional objects and aspects of novelty and utility relate to details of the construction and operation of the automatic cover-feeding and foil-feeding and stamping mechanisms and the synchronizing control means therefor, and other parts of the apparatus described hereinafter in view of the annexed drawings in which:

FIG. 7A is a magnified and partially sectionalized detail of the one-way clutch of FIG. 7;

Figure 1:
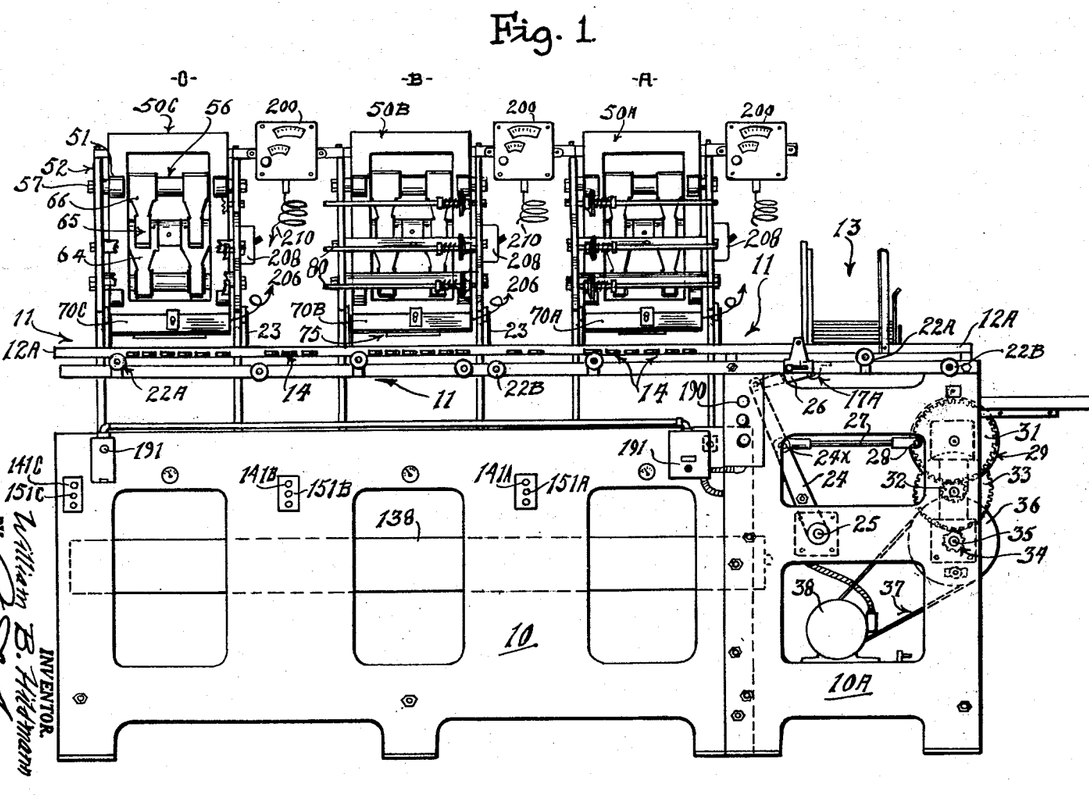
FIG. 1 is a front elevation of the complete machine with parts broken away at one station.
Figure 4:
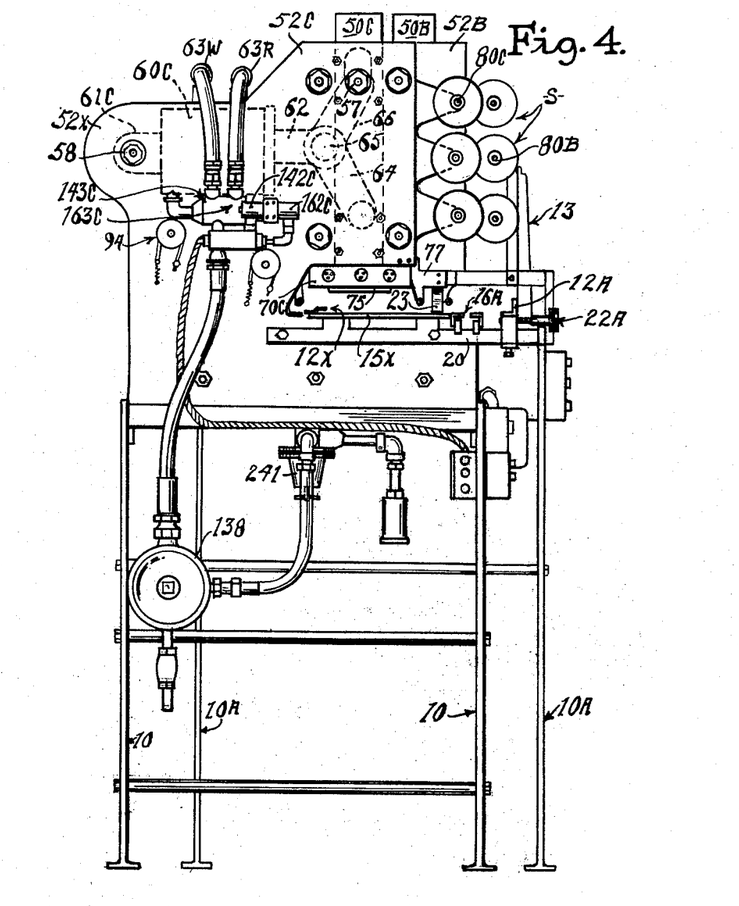
FIG. 4 is a view at the outfeed or discharge end of the machine.

As depicted in FIG. 1, the machine comprises a large base structure 10 including an offset infeed section 10A, with a feed bed 11 extending along an upper level thereof from beneath a cover-stacking hopper means 13 onwardly beneath each of three embossing heads situated at evenly spaced stations designated A, B, and C in FIG. 1, said bed terminating at the opposite outfeed or discharge end of the machine seen in FIG. 4.

Figure 8:
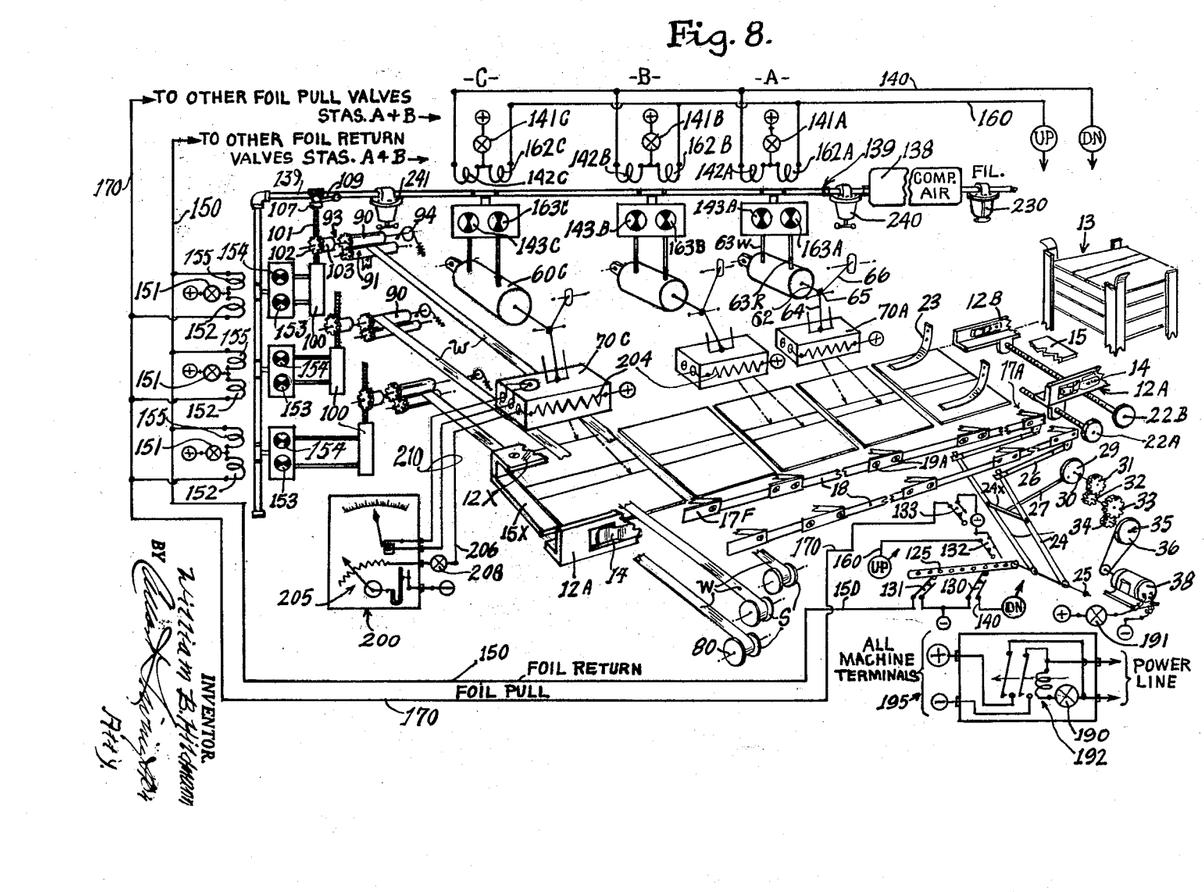
FIG. 8 is a schematic operating diagram.

Viewed from its infeeding end (FIG. 2) the bed 11 consists of a heavy, wide, and elongated glide plate 15 fixed on the frame in a central position and flanked along both longitudinal edges by a pair of pusher slideways 16A, 16B leveled flush therewith, the outer slideway 16A extending the full length of the bed to the discharge end, as seen in FIGS. 1 and 4, while the inner slideway 16B is shortened and extends only past the first two stations A and B to terminate just ahead of the last station C for the reason that the latter is offset relative to the bed as will be more fully explained hereafter, the glide plate at the terminal section of the bed being widened as at 15X (FIG. 4) to bridge the gap of the shortened slideway, it being understood that the book covers are supported in flat, opened condition, inner sides facing down, upon the central plate, the flanking slideways, and angled side rails 12A, 12B, as in FIG. 8.

Figure 6:
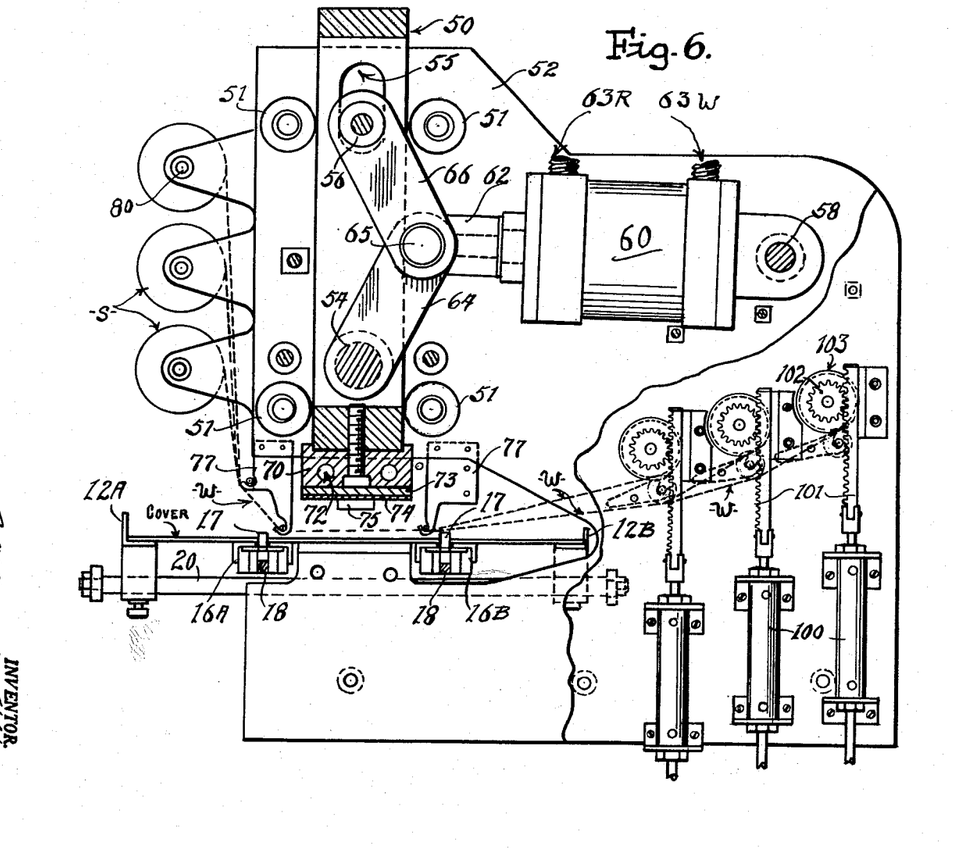
FIG. 6 is a partially sectionalized side view of one of the stamping heads shown to enlarged scale with parts broken away.

Step-by-step transport of the covers is effected by a plurality of tandem pairs of pushers, generally designated by reference 17, and seated in the slideways 16 in the manner shown in FIG. 6, there being six such pairs specifically designated 17A to 17F where necessary to indicate their relative spacing along the bed (as in FIGS. 5 and 8), the first or main driving pair 17A being situated at the infeed station to move beneath the hopper means 13 and strip off one set of covers at a time from the bottom of the stack and push the same to a point just beyond the hopper part way toward the first die station to be picked up thereafter by the next pair of pawls 17B on the back stroke thereof, and so-on, until each set of covers has been lodged successively in register beneath the first two die heads and finally beneath the last die at station C from which latter position they will then be pushed to the end of the bed only by the following set of covers, rather than by pawls.

The covers are maintained in exact registry with respect to the embossing dies by means of the several pairs of pawls 17 and the pair of upstanding side rails 12A, 12B (FIGS. 2, 6, and 8), which are in the form of brass angle bars slidably seating on cross bearers 20 on opposite sides of the bed and respectively engaged by adjusting screw rods 22A and 22B, by means of which the width of the bed is regulated in accordance with the size of covers processed, said rails having a series of closely spaced, elongated slots cut in the sides thereof to admit the inturned ends of spring presser fingers 14 (FIG. 8) secured on the outer sides of the rails at each appertaining slot, said spring ends pressing against the side edges of the covers while the trailing edges thereof are engaged by the twin feed pawls, with the result that a three-sided guidance is imposed upon the covers which keeps them at all times in register.

Owing to the offsetting of the last station, the terminal portion of the inside rail 12B must be omitted at this end of the bed and a flat guide strip 12X is provided on the widened plate portion 15X to complete the necessary terminal guidance. In addition, the covers are held down on the bed by a series of long, downwardly-bowed blade springs 23 (FIG. 8) attached variously to the foil guide rod brackets 77 and the die head plates 52 at intervals (FIG. 1).

Figures 2, 5, 7:
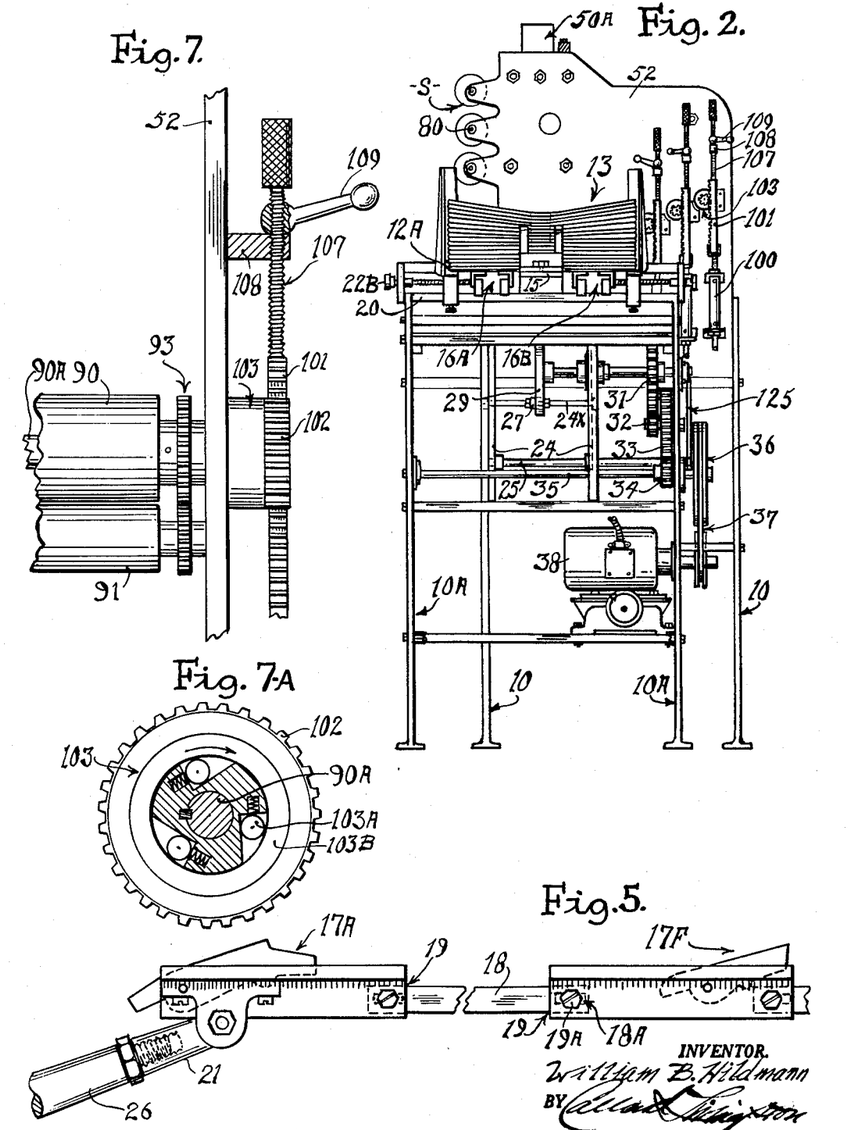
FIG. 2 is an elevation of the infeed end of the machine with the first temperature regulator removed.
FIG. 5 is a magnified fragmentary detail showing parts of the tandem cover-feeding pawls.
FIG. 7 is an enlarged detail of parts of the foil-pulling roller mechanism.

The feed pawls 17 are reciprocated by drive means including a pair of twin rocker levers 24 (FIGS. 1 and 8) fixed on a first countershaft 25 beneath the bed at the infeed station, and each connecting at its upper end by means of a short driving link 26 to a corresponding one of the two leading infeed pawls 17A, such that oscillation of these levers 24 will effect back and forth travel of this set of pawls, which in turn drive the remaining tandem pairs 17B . . . 17F through connecting rods 18 (FIGS. 5 and 8), these rods being square and fitted into endwise slots at 19 in the pawl slide blocks, each of these rods having an elongated slot 18A in its end traversed by a clamping screw 19A threaded into the pawl block so that the pawls may be shifted slightly in stroke for critical cover registry with the dies, as necessary, the principal stroke adjustment being taken up, however, by a threaded connection at 21 between the driving links 26 and their yokes 26A connecting them with the pawl blocks (FIG. 5).

The twin levers 24 are oscillated by means of a crank rod 27 connecting to a tie rod 24X joining these levers, said crank rod being connected at its remaining end with a pin 28 on a crank wheel 29 fast on a second countershaft 30 at the infeed section and driven through a train of spur gears 31, 32, 33, and 34 from a main drive shaft 35, having fixed thereon at the outer rearward side of the infeed frame a pulley 36 driven by belt means 37 from a motor 38 adjustably tabled on cross bearers at the bottom of the infeed section, said motor being of the type having a built-in brake (not seen) to facilitate jogging of the machine.

Figure 3:
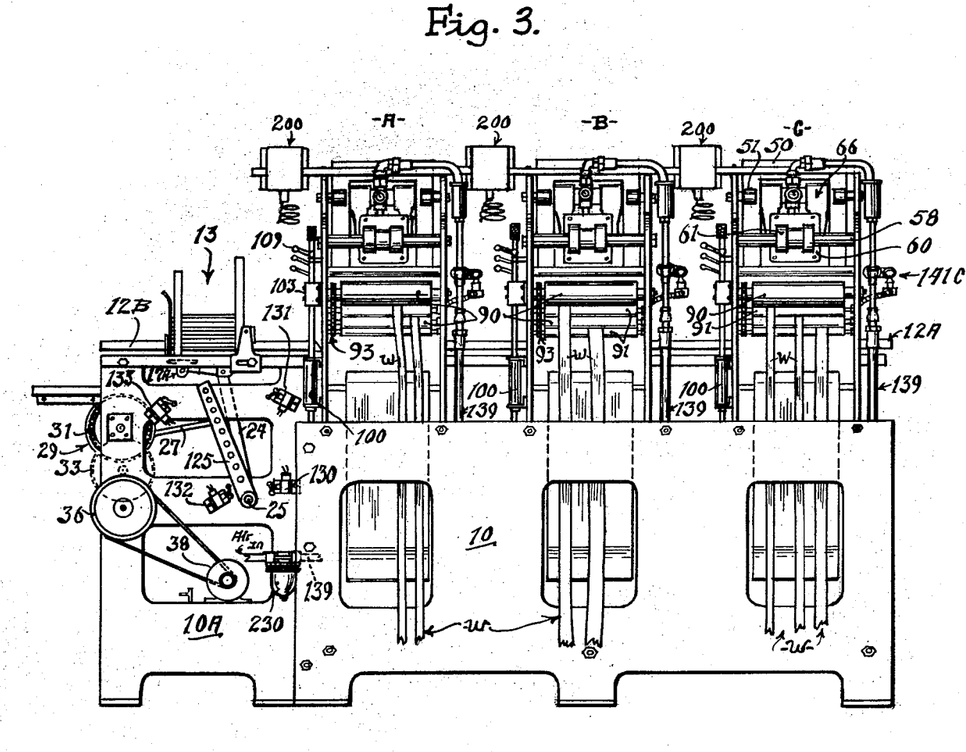
FIG. 3 is a rear elevation of the machine.

As viewed in FIG. 3, there is also fixed on the countershaft 25 with the main rocker levers, but on the outside of the frame, a long timing lever 125 adapted to actuate radially-located pairs of control switches 130–131 and 132–133 situated at opposite ends of the oscillatory arc of this lever, the control functions of these switches being explained hereafter in view of FIG. 8.

The embossing or stamping means provided at each of the three stations A, B, and C is basically identical, such differences as exist relating to certain critical positioning and imprint zoning of the embossing dies and actuating means therefor, as hereinafter explained, each said station including, generally, a die head comprising a pair of heavy, upstanding mounting or head plates, a block-shaped, heated die carrier, a vertically reciprocable toggle frame for the carrier, and pneumatically-actuated toggle mechanism for moving the frame up and down to imprint the covers delivered into registered position in the bed therebelow, together with pneumatically actuated foil-pulling means.

As depicted in FIGS. 1 and 4, the stamping mechanism or "head" at the last station comprises a rectangular, vertically-reciprocable toggle frame 50C positioned between a pair of upstanding head plates 52 to which are secured opposite pairs of upper and lower guide rollers 51 bearing against the frame legs on opposite side thereof to confine the frame to a vertical plane of reciprocation.

Spanning the lower end of the toggle frame is a floating lower bearing rod 54 (FIG. 6 also) seated in the side legs, only, of the frame itself to move with the latter, while at the upper ends of these frame legs are provided oppositely-aligned, vertically-elongated clearance slots 55 adapted to pass a fixed upper thrust rod 56 extending entirely through the toggle frame and secured at its opposite ends to the corresponding head plates, as at 57 (FIG. 4), it being noted that the view of FIG. 6 is typical of the head structure at either the first or the intermediate stations A and B, while the view of FIG. 4 shows the modified head structure and offset employed at the last station C.

Spaced horizontally away from the toggle frame toward the rear side of the pair of head plates, and securely seated in the latter, is a heavy cross rod 58 (FIGS. 3 and 6) upon which is pivotally anchored the tail lug 61 on the end of the appertaining cylinder block 60C of a pneumatic ram having a piston rod 62 (FIG. 6) pivotally connecting to the knuckle bearing 65 (FIG. 1 also) of a pair of toggle levers 64 and 66 respectively working on said bearing rods 54 and 56.

At the top of each ram cylinder are inlet nipples for reverse operating connections to the compressed air line, as will appear, including a connection 63W for the working stroke, and connection 63R for the return stroke. When the piston rod moves outwardly on the working or power stroke, the toggle arms 64 and 66 straighten substantially about the knuckle 65 and drive the toggle frame 50 downwardly, since the upper rod 56 is fixed immovably in the head plates; and upon the return stroke of the piston, this action is reversed and the frame 50 and dies carried thereby are restored to the normally elevated position shown in FIGS. 4 or 6.

Secured by suitable bolt means 71 to the foot of the toggle frame (FIGS. 4 and 6) is a die-carrying block 70C having longitudinal bores at 72 to contain electrical heating elements 204 shown schematically in FIG. 8, said block also having on its bottom face a gib track 73 into which is fitted a removable sub plate carrying the required embossing die 75 (FIG. 6).

Integrally formed along the front vertical edge of one of the head plates 52 of each pair are triangular projections 53 (FIG. 6) respectively bored to seat a horizontal foil spindle 80 adapted to carry a number of spools S of embossing foil or tapes of different width and coloration, for example, gold, silver, aluminum, and like metallic foils in a variety of colors, the webs W of which are led down over guide rods 76 supported by brackets 77 adjacent the dies for spacing relative to the required imprint zones selected for width and coloration or copy, and across which the webs are pulled by feed roller means to be described.

The construction of the die head shown in FIG. 4 differs from that employed at the other two stations (e.g. FIG. 6) in that the die-carrying block 70C at the third station is larger crosswise than the carriers at stations A and B, as portrayed particularly in FIG. 8 wherein it is noted that the first two carriers 70A and 70B are relatively narrow and overlie the backbone regions of the covers, while the last carrier 70C is offset toward the back side of the machine and spans a much greater embossing zone including not only the width of the backbone but the entire front cover, as well, the pneumatic ram 60C at this last station having a longer power stroke (6-inch) compared with the 4-inch stroke provided for the two narrower die carriers.

In order to provide for the longer power stroke and the zonal offsetting of the last die head, as aforesaid, the pair of head plates 52 at the last station are provided with a horizontal extension 52X (FIG. 4) to properly locate the appertaining anchor rod 58 for the tail lug 61C of the longer-stroke piston. The relative amount of offsetting of the last station is illustrated by the relative locations of the foil spindles particularly designated 80B and 80C, as seen in FIG. 4.

Referring to the rearward elevation of the machine in FIG. 3 (FIG. 8 also), the webs W of the metal foil ribbons, after passing variously beneath the dies at their respective stations, are led out between corresponding pairs of feed rollers, there being three identical pairs at each station, one pair for each foil spindle 80, said pairs each comprising an upper, knurled drive roller 90 and a compansion presser roller or platen 91, both journalled in the appertaining pair of head plates and the three pairs being arranged in a stepped or ascending relation at each station to correspond to the three levels of the foil spindles which they serve.

Each of the knurled drive rollers 90 is advanced unidirectionally by pneumatic piston means 100 (FIGS. 2 and 6), having a gear rack 101 on its piston rod engaging a pinion 102 coupling through a built-in one-way roller clutch means 103 (FIG. 7) to the spindle 90A of the corresponding feed roller in such direction that on the up stroke of the piston and rack, responsive to admission of driving air on the power stroke, the clutch rollers 103A will grab the clutch race 103B (FIG. 7A) and turn the knurled roller 90 to pull the foils a predetermined distance determined in each case by the setting of a threaded stop rod 107 (FIGS. 3 and 7) selectively positionable in a threaded block 108 and secured by a lock nut means 109 so as to limit the upward or power stroke of the corresponding gear rack 101, the pressure employed in these small piston units 100 being held at about 15 lbs. which permits such stoppage without damage. Each feed roller 90 preferably drives its platen roller through gears 92 at the rearward inner face of the head plate (FIG. 3) and rollers 90 are preferably loaded to assure accurate stoppage and clutch action by means of small spring-loaded brake discs 93 at the outer ends thereof opposite from the clutch-driven ends (FIG. 4).

The operation of the die means and the foil-feeding means at each station is synchronized with the cover-feeding operation in such manner that all dies move up and down in unison, and all foil rollers advance in unison at times when the dies are withdrawn and while the covers are being advanced. However, any ram or foil-pulling unit may be cut out of operation by supervisory cut-out switches described hereafter.

The aforesaid synchronization is achieved in a simple manner through the operation of the master control lever 125 located at the back side of the infeed station 10A (FIGS. 3 and 8), said lever being fast on the cover-feeding countershaft 25 so as to move in unison with the twin pawl driving levers 24.

Positioned in pairs at opposite sides of the lever 125 are four master timing switches 130, 131 on one side, and 132 and 133 on the opposite side (FIG. 3), the two switches 130 and 132 on the shorter or lower arc of the lever being so positioned as to close slightly in advance of their companion switches 131, 133 on the longer upper arc.

When the feed pawls 17A advance to feed in a new set of covers from the bottom of the hopper, all previously advanced covers will be moved ahead exactly the same distance by the tandem pawls 17B . . . 17F, so that a set of covers will come to rest beneath each embossing die in the exact position required to register the intended imprint, the registry being so accurately maintained at all points of travel by the previously-mentioned three-point guidance, that overlays or re-runs over previous impressions can be precisely laid down without special handling.

At the end of the forward or cover-advancing stroke of the master lever 125, the lower or "heads down" switch 130 will close first, causing the die heads to start down; and quickly thereafter the corresponding upper or "foil return" switch 131 will close to cause a restoration of the foil-feeding pistons to their respectively lowered starting positions.

Closure of the "heads-down" switch 130 operates three solenoid air valves simultaneously for activating the three toggle rams or pistons, this being accomplished by closure of a circuit via conductor 140 and the respective normally-closed, manual supervisory cutout switches 141A, 141B, 141C to energize each of the three valve-operating coils 142A, 142B, 142C to open the appertaining "down-valves" 143A, 143B, 143C, thereby admitting compressed air from the tank 138 and feeder line 139 into each ram cylinder via the respective inlet nipples 63W thereof with the result that the corresponding piston rods 62 will move out in the working stroke and actuate the appertaining toggle leverages 64–66 to thrust the several embossing dies 70 down upon the underlying foil tapes W variously positioned above the desired imprint zones on the covers therebeneath, such impressions being allowed a suitable dwell of several seconds duration depending upon the types of foil and cover stock involved.

As initially mentioned, the closure of the "heads-down" switch 130 is very quickly followed by closure of the companion "foil-return" switch 131, with a resultant energization, via conductor 150, and three normally closed, manual supervisory cutout switches 151 of all "foil-return" coils at all stations, for example, the three coils 152 at the third station which will open the appertaining foil-return air valves 153, which in turn will cause the three foil air pistons 100 again to move down to starting position, the three sets of knurled feed rollers 90 standing still.

During the brief impression dwell, the twin cover-feeding pusher levers 24 and the timing lever 125 return to starting positions (counterclockwise, FIG. 3; or clockwise, FIG. 8) preparatory to initiating another work cycle by actuating the second pair of master switches 132 and 133, the lowermost one of these switches, 132, being the "heads-up" switch and being closed slightly in advance of the companion "foil-pull" switch 133, in order that the die heads may rise free of the covers and foils before the foil webs start to move under control of said switch 133.

Closure of the "heads-up" switch 132 actuates the appropriate solenoid valves by energizing, via conductor 160 (and the three appertaining normally-closed, manual supervisory switches 141A, 141B, 141C), the solenoid valve coils 162A, 162B, 162C, thereby closing the corresponding previously-opened "down" valves and opening the three "heads-up" valves 163A, 163B, 163C, to admit air from line 139 to the ram cylinders via the return-air connections 63R, with a consequent actuation of the toggle leverages to raise the three dies back to starting position in readiness for a repetition of the foregoing work cycle, which will begin again with the removal of the next set of covers by pawls 17A from the bottom of the hopper stack as the twin levers 24 rock back counterclockwise and then forward again on the next stroke, as in FIG. 3; or clockwise as in FIG. 8.

The "foil-pull" switch 133 when closed, as aforesaid, by lever 125 on its back stroke, will close all three of the foil-feeding or -pulling valves 154 by energizing their respective coils 155 (assuming the corresponding supervisory switches 151 to be closed) thereby causing the piston units 100 to pull the gear racks 101 downwardly back to starting position without moving the feed rollers 90, owing to slippage in this direction of the one-way roller clutch means 103, it being understood with respect to this part of the circuit of FIG. 8 that tripple valve control units 151–155 are provided at the remaining stations A and B, to which the timing switch conductors 150, 170 are extended for identical connection and operation as at station C.

The duty cycle being wholly controlled by the lever 125, it becomes possible to control the operation of the entire machine by simply starting and stopping the motor 38, the built-in brake of which makes it possible to jog the feeding when necessary by nudging operation of switch means 191 (FIG. 8), conveniently located at the front of the machine close to the infeeding station (FIG. 1), the entire power supply being controlled by a master relay switch means 190–192 likewise located on the front of the machine bed close to the switch 191, this master power switch being depicted schematically in the diagram of FIG. 8 as connecting and disconnecting the power line supply with the master power terminals for the entire machine depicted schematically within the encircled positive and negative symbols 195, it being understood that the use of such positive and negative power terminals and connections is intended to designate only symbolically any suitable power supply, the preferred source being the usual 220-volt A.C. service line.

The embossing dies are heated by means of electrical heater elements 204 (FIG. 8) carried in the longitudinal bores 72 in the die carrying blocks referred to in view of FIG. 4 or 6, and the temperature is maintained by a known type of thermal regulating unit 200 which includes a selectively pre-set rheostat and thermostat adjustment 205 in circuit with the power source and heater element via conductor 206, there being one of these regulating units 200 at each station situated at a reading elevation along side each die station (FIG. 1), and each having its own cutout switches 208 so that the heaters, like the individual foil-pulling pistons and toggle rams, may be selectively cut in and out of circuit, it being frequently necessary, for instance, to employ only one or two dies for certain kinds of job. Cables 210 connect heater and thermocouple leads 206, 209 to units 200.

The compressed air distributed to the several rams and foil-feeding pistons is preferably tapped off at each station from a long tank 138 housed beneath the conveyor bed 11 in the base (FIG. 3), this air being suitably filtered, and the pressures maintained, by conventional filter means 230 and regulator means 240, 241 conveniently located beneath the feed bed adjacent the respective stations served, the working pressure being about 80 p.s.i., and it being preferred that each air piston or ram at each station be provided with a separate regulator.

The aforesaid normally-closed, manually-operable supervisory switches, e.g., 141A for the ram at station A, or the several foil supervisory switches 151, are conveniently grouped at their corresponding stations at the front of the base 10 (FIG. 1).

The machine illustrated is considerably smaller and lighter in weight than prior types of book embossing machine which have operated at slow rates with gross mechanical forces up to 150 tons to do similar work and have been incapable of an output of much over 1,200 covers per hour, whereas the new machine is capable of consistent output of 3,600 covers per hour with multiple impressions imparted at several stations, either straight, overlaid, or repeated, in a variety of colors and types of foil, all in one continuous transit through the machine without any special manipulation, or handling of individual sets of covers, comparable performance by prior machines being in many instances impossible, and even where possible, entailing multiple handling and re-run operations with some danger to the attendants, as well as increased cost, increased rejects, and a great waste of foil, the raremetal varieties of which (e.g. gold) are very costly.

The disclosed machine effects significant savings in foil by reason of the unique multiple-level distribution and multiple-spooling and feeding thereof in several webs, which may be selected as to width and regulated in feeding in accordance with the size and extent of copy to be embossed, a narrow panel or border line in gold, for example, being struck from a correspondingly narrow ribbon of gold foil advanced in exactly the necessary length to leave a minimum of waste at the remnant ends, the larger typographic and design impressions being likewise struck from foil ribbons of optimum width and regulated pull for minimum wastage, the savings in foil alone being an important feature of the machine, which added to the versatility of imprint possible and the high production rate achieved, and favorable cost and size factors, provide an outstanding advance in machines of this class.

The actuation of the die rams by pneumatically displaced pistons affords a very satisfactory power and control system, but other fluid displacement means, such as hydraulic rams with suitable electric valve means may be substituted in the system if desired, and this applies as well to the foil-pulling pistons, it being observed that the unitary structural character of each die head which provides a pair of upstanding side plates as a mounting for the die guide, the ram, the foil-pulling pistons, and the valves makes it especially efficient and convenient to drive and control all of the working components of each such individual head from one source of fluid pressure.

I claim:

1. In a machine for embossing book covers, means providing a feed bed, a plurality of die stations spaced along said bed, a die carrier movable up and down at each station for embossing engagement with a set of book covers delivered therebeneath, embossing die means carried by each said carrier, at least one of said carriers being offset from the others in a direction laterally away from the backbone region of said covers and having a greater embossing area than said others to engage said backbone region and at least the front cover thereof, means for feeding covers step-by-step along said bed into and out of embossing position beneath said carriers at each station, mechanism for moving each die carrier as aforesaid, fluid-pressure means for individually actuating the aforesaid mechanisms, fluid-pressure-actuated roller means at each station for feeding embossing foil webs between said die means and covers in the bed therebeneath, and synchronizing control means operable in duty cycles for actuating all of the said fluid-pressure means in timed coordination whereby said carriers cause said die means to move simultaneously to engage and disengage cover portions, and to effect foil-feeding operation at the respective stations at times when the covers are at rest in said bed, and to effect feeding operation of said cover-feeding means only at times when said carriers dispose said die means out of engagement with said covers and foil webs.

2. Apparatus according to claim 1 wherein said offset die carrier is the last of the plurality and said cover-feeding means includes a plurality of serially spaced cover pushing pawls spaced apart lengthwise of said bed to engage and push individual cover sets from an infeeding station at the beginning of said bed into embossing position beneath the die means at the respective stations except said last offset station, covers being delivered to and past the die means at said last station by the next following pawl-moved set of covers.

3. Mechanism according to claim 1 in which said synchronizing control means comprises: electric valve means for actuating said fluid-pressure means; an oscillatory drive lever means for actuating said conveying means; a timing lever moved in synchrony with said oscillatory lever means; and switch means connecting with said valve means and actuated in a certain timed relation by said lever means in certain opposite oscillatory positions thereof at the beginning and end of each duty cycle for actuating said fluid-pressure means in coordinated relation in the manner and for the purposes aforesaid.

4. A multi-station embossing apparatus comprising: a plurality of die heads arranged in series along a conveying path and each provided with a reciprocable die carrier and a drive mechanism cooperable therewith for actuation to move the carrier toward and away from said path to impress a die held by the appertaining carrier against an object of predetermined size and form disposed thereat in said path; conveying means for moving said objects uniformly in start-stop manner at a predetermined rate along said path into and out of impression position as aforesaid; a pneumatic ram at each said head and having a working piston operable to reciprocate the corresponding carrier as aforesaid; foil feeding means for each said head and comprising a plurality of independent feed rollers and an adjustable pneumatic drive means individual thereto, together with web guiding means for directing a plurality of webs of embossing foil laterally across said path between said objects and the die at the appertaining head for movement preselected identical or different amounts by a corresponding feed roller and drive means; and timing means operating coordinately with said conveying means for actuating said pneumatic rams and said pneumatic roller drive means in timed relation to effect operation thereof, and to die-press said webs against conveyed objects at different positions thereon laterally of the direction of travel thereof only while the latter and the corresponding webs are in a condition of rest at each head, and to effect conveyance of said objects only at times when the dies have been started away from the webs and objects.

5. Apparatus according to claim 4 further characterized in that there are at least three of said die heads and the first two have die carriers and die means of a predetermined area and alignment with said path to emboss a certain limited area on said objects, and the third head is offset laterally of said path and has a larger die carrier with die means situated out of alignment with the first two die heads and of a size capable of holding die means to cover the object areas covered by the first two dies and a substantially greater area thereof in addition, whereby multiple embossments and registrations and overlays can be had in a single transit of an object along said path.

6. In a machine for embossing book cases consisting of a backbone panel having a set of flanking covers hinged thereto, at least three reciprocable die carriers arranged serially along a linear feed bed, and means for feeding, guiding and moving said cases in series lengthwise of the backbone successively beneath and beyond said carriers and stopping each of the cases for a predetermined embossing dwell thereat, the first two of said die carriers being disposed relative to the line of advance of cases in said bed so as to be aligned with, and of an area to cover, only the backbone areas of the cases passing therebeneath, and the third die carrier being offset laterally from said line of advance of the backbone area of the cases and of an area to overlie both the backbone area and the front cover area of a case thereat; means for intermittently feeding embossing foil webs laterally between the dies and cases therebeneath; fluid-displacement means operable to raise and lower said carriers simultaneously to move the dies in and out of embossing engagement with said webs and cases; and means cooperative with said feeding means for coordinately actuating the latter, said fluid-displacement means and said web-feeding means in timed operation to advance the cases and the webs relative to said dies at times when the latter are raised, and to lower the carriers at times when said web-feeding means and said case-feeding means are at rest.

7. In a book-embossing machine having a vertically reciprocable die means for impressing foil webs upon objects conveyed thereto, and conveying means for moving said webs seriatim into and out of impression position relative to said die means, improvements in foil-feeding mechanism comprising, namely: a die head mounting said die means for operation as aforesaid, a vertically reciprocable die frame carrying the die means aforesaid, a toggle leverage pivotally engaging said frame and operative on a plurality of parallel axes at least two of which are included at all times within the plane of said frame; a reversible ram having driving connection with said frame on one of said axes and operable to move the frame up and down in embossing action; means operatively associated with each of the heads for supporting at least three foil spindles in parallelism with said axes at a side of said frame remote from said ram and at one side of said impression position in the direction of withdrawal of the frame and die means from said objects, said spindles being each of a length to receive a plurality of foil spools each bearing a foil web of predetermined desired width to cover a certain die zone; means supported by said head for guiding the webs from all spindles in said zones across the paths of die movement toward said objects at each said head and in a direction toward said ram; web-pulling rollers in multiple sets at each said head and supported in stepped relation adjacent the said ram location thereat, there being one such set for each of said spindles at each head, the foil webs from appertaining spindles being directed away from the corresponding die means into operative engagement with the corresponding set of rollers; reversely-acting pneumatic means for actuating said ram; reversely-acting pneumatic piston and unidirectional drive means for each set of rollers for driving the roller sets to pull the appertaining webs across the die zones as aforesaid, and means for coordinating the reverse operation of said pneumatic ram-actuating means and said pneumatic piston means to actuate the latter in web-pulling operation only at times when the ram is moving the die means in a direction away from the webs and embossed objects.

8. In an embossing machine, the combination with means providing a feed bed and feed mechanism operable to advance objects seriatim along a predetermined path thereon, step by step in start-stop manner, of a plurality of vertically-reciprocable embossing die carriers situated at succeeding stations along said path and each positioned to carry and imprint an embossing die upon a predetermined embossing area on one of said objects disposed therebelow in said path, the said embossing areas including at least one which is offset laterally from the other said areas with respect to the line of feeding advance of the objects along said path; and means for intermittently feeding predetermined renewal lengths of embossing foil laterally of said path between said objects and each of said dies in accordance with the lateral width of the embossing die copy and in coordination with the movements of the appertaining die carriers at each station at times when said dies are disengaged by the carriers from said objects; together with means for actuating said carriers and coordinating the movements thereof with said feed mechanism into and out of of embossing engagement with said objects at times when the latter are at rest therebelow between advancing steps along said path.

9. In a machine for embossing book casings of the type comprising a pair of covers hingedly attached in flanking relationship to a backbone and capable of lying in flat open condition in a feed bed for advancement thereon lengthwise of the backbone's axis, the combination of: means providing a flat casing feeding bed and guiding said flat open casings along a linear path thereon with said backbones moving in the direction of their length; means operating in a predetermined start-stop time cycle for advancing said casings step by step along said path and arresting each casing for a dwell at each station therealong; embossing means at each said station and respectively including a carrier and die means thereon moved thereby into and out of embossing engagement with a casing arrested thereat, each said carrier having means for receiving an embossing die which is positioned thereby to impress a predetermined area of the casing thereat in predetermined locations laterally with respect to path of travel of the casings and said axis thereof, such that impressions at certain stations will be made upon areas of the front covers of the casings, while impressions at at least one other station will be offset laterally of said path and axis upon areas of said backbones at any of a plurality of desired positions along said axis thereof; together with means for feeding embossing foil relative to each embossing die; and means for coordinately driving said casing-advancing means, actuating said die carriers, and said foil-feeding means in a timed relation such that the embossing impressions are made at each station upon such cover and backbone areas as may be exposed thereat at a time when the covers are arrested as aforesaid, and actuating said foil-feeding means at times when said dies are disengaged from said covers, and the covers are advanced from one station to another at times when said dies are disengaged therefrom, each said duty cycle comprising an advance of the casings one step, an impression of all dies upon any casing at the appertaining stations, a predetermined feeding of said foil equal in the case of each foil to the length of the die imprint to be made thereon.

10. In a multiple die head embossing machine, a die head construction including a pair of upstanding side plates spaced in parallelism; means supported by said plates near corresponding vertical front margins thereof defining a vertical guideway; a die carrier reciprocable vertically in said guideway, a fluid-displacement ram supported by and between said plates and including a reciprocatory drive member and a toggle drivingly interconnected with said carrier to move the latter up and down responsive to application of negative and positive pressures to said ram; electric valve means mounted as a part of said head for controlling pressures as aforesaid to the ram; a plurality of sets of foil-pulling rollers supported to rotate between said plates at the side thereof opposite from said guideway; fluid-pressure drive means carried by said head for separately driving each set of said rollers; horizontal spindle means for foil rolls carried by said head on the front side thereof at a plurality of vertically spaced levels and each capable of supporting a plurality of rolls of embossing foil thereon aggregating in total width nearly the distance horizontally across the die carrier; and means at the front and rear sides of said head for guiding foil from rolls on said spindles down beneath a lowered position of a die in said carrier from the front toward the rear of said head and into engagement with one of said sets of feed rollers.

References Cited by the Examiner

UNITED STATES PATENTS

| | | | |
|---|---|---|---|
| 733,039 | 7/03 | Hendrickson. | |
| 1,144,340 | 6/15 | Campbell | 101—316 |
| 1,626,444 | 4/27 | Barnes | 101—336 |
| 1,687,241 | 10/28 | Grupe | 101—336 |
| 1,731,896 | 10/29 | Harris | 101—198 |
| 1,898,782 | 2/33 | Littlefield. | |
| 1,908,921 | 5/33 | Rosenthal | 101—193 |
| 1,910,918 | 5/33 | Hehn. | |
| 2,039,699 | 5/36 | Baizzi | 101—44 |
| 2,433,672 | 12/47 | May | 100—272 X |
| 2,604,387 | 7/52 | Mintz. | |
| 2,621,435 | 12/52 | Weber. | |

ROBERT E. PULFREY, *Primary Examiner.*